OR 4,046,458

United States

Smulders et al.

4,046,458

[45] Sept. 6, 1977

[54] CENTERING OF LENSES

[75] Inventors: Hendricus Franciscus Gerardus Smulders; Adrianus Jacobus Jozef Franken, both of Eindhoven, Netherlands

[73] Assignee: U.S. Philips Corporation, New York, N.Y.

[21] Appl. No.: 544,349

[22] Filed: Jan. 27, 1975

[30] Foreign Application Priority Data

Feb. 15, 1974 Netherlands .................... 7402076

[51] Int. Cl.² .................... G02B 7/02; B29D 11/00
[52] U.S. Cl. .................... 350/178; 350/252
[58] Field of Search .............. 350/178, 252; 356/127

[56] References Cited

U.S. PATENT DOCUMENTS

| 2,266,169 | 12/1941 | Crumrine | 350/178 X |
| 3,466,728 | 9/1969 | Warner | 350/252 X |
| 3,599,377 | 8/1971 | Dartnell | 350/178 X |

OTHER PUBLICATIONS

Carnell et al., Optica Acta, vol. 21, No. 8, Aug. 1974 pp. 615–629.

Primary Examiner—F. L. Evans
Attorney, Agent, or Firm—Frank R. Trifari; David R. Treacy

[57] ABSTRACT

A method of optically centering a lens, in which each lens is placed between two clamping pipes, after which the clamping pipes are moved towards each other. A pressurized fluid flows between the lens and bearing surfaces on the pipe ends to eliminate friction which would prevent accurate centering. The lens may then be cemented to the lower clamping pipe as a lens mount. A number of mounting rims may be similarly stacked in sequence on the mount to form a lens assembly.

9 Claims, 7 Drawing Figures

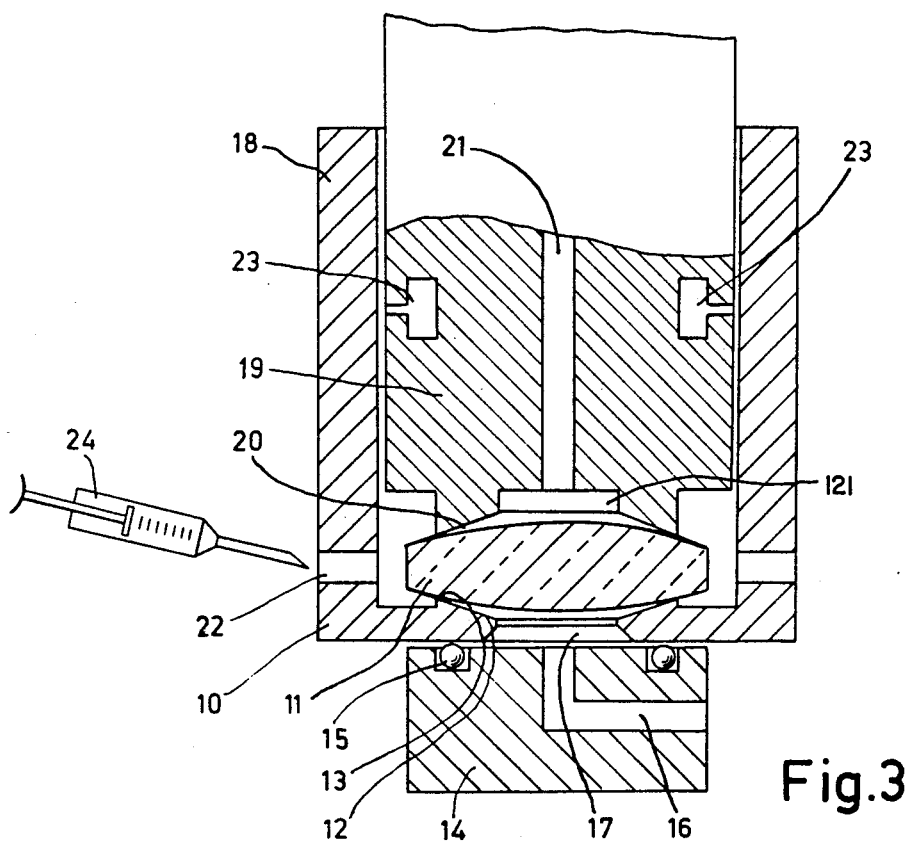
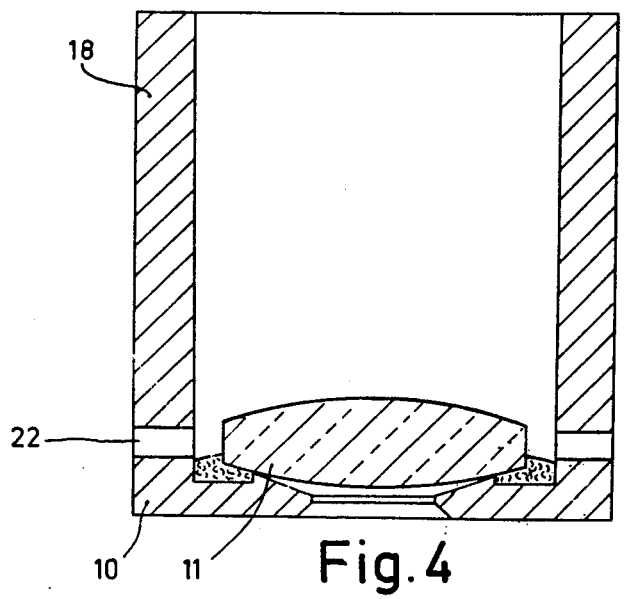

CENTERING OF LENSES

The invention relates to a method of optically centering at least one lens, which is disposed between the bearing surfaces of two clamping pipes of a centering device arranged opposite each other.

Lens centering is to be understood to mean the operation of making the mechanical axis of a mounted lens coincide with the optical axis within certain tolerances.

Such a method is known from the book "Feinoptik-Glassbearbeitung", Carl Hanson Verlag, Munich, p. 51-61. According to this method lenses with highly curved surfaces are mechanically centered by clamping the lens between two clamping pipes. However, the centering accuracy greatly depends on the angle of friction between the curved faces of the lens to be centered and the clamping pipe at the location of clamping.

This is related to the coefficient of friction between the centering face of the clamping pipe — polished steel — and the glass surface of the lens. The frictional force as the angle of friction decreases. At angles of friction smaller than approximately 10° of arc the friction increases to such an extent that sliding of the lens between the clamping pipes is no longer possible.

The invention provides a method which completely obviates this drawback. According to the invention during centering of each lens a medium is admitted to interior spaces of both clamping pipes, while the clamping pipes are moved relative to each other until a gap is obtained between each lens surface and an associated bearing surface at the end of each pipe. Due to the pressure of the medium the lens comes clear of the relevant bearing surfaces and the medium leaves the centering device through each gap.

The lens can be placed in the centering device in different manners. It is possible to place the lens on a fixed clamping pipe, after which the other clamping pipe which is disposed above the lens is lowered. Another method is to clamp the lens between and at a distance from the clamping pipes and to move the two clamping pipes in the direction of the lens, after which the lens is unclamped during centering.

After centering the lens can be clamped by means of the two clamping pipes, and the lens may then be subjected to a different operation, for example facet grinding.

As a medium either a liquid or a gas may be used. In the first case a cooling liquid may also be employed to remove possible contamination at the lens. In the latter case compressed air is a suitable medium.

During centering a hydrostatic or aerostatic bearing is obtained between the lens and the bearing surfaces by means of which the friction is reduced to substantially nil.

Such a bearing is constituted by the spherical surface of the lens and the associated bearing surface, such that the bearing gap decreases from the inner towards the outer edge, i.e. in the direction of flow of the medium.

The bearing surface may be either conical or spherical, depending on the shape of the facing lens surface.

The rigidity of the bearing is greatest at the point of eventual contact between the bearing surfaces the generatrices of the conical surface are at the coincident with tangents to the spherical surface.

Thus, the lens is supported at both sides, so that the lens floats between the bearing surfaces and is automatically centered.

Concave lenses may also be centered in this manner. The bearing gap, as before, should decrease from the inner edge towards the outer edge.

According to a modification of the inventive method the lens need not be ground. Prior to centering, the lower clamping pipe serves as a lens mount and is placed on a plunger of the centering device, which plunger is provided with a medium supply channel. Subsequently communicating with the clamping pipe interior space the lens is placed on the mount, the lens being secured in the mount after centering.

Thus, a product is obtained which consists of a mount in which a centered lens is secured.

In this manner it is also possible to obtain an objective or similar lens system in a common cylindrical casing. First, the casing is placed on a plunger of the centering device, and then the first lens, after which centering takes place.

After centering the first lens is clamped by means of the two clamping pipes, i.e., the upper clamping pipe presses the lens onto the associated bearing surface of the casing. Using openings in the casing at the location of the lens the lens is temporarily or permanently cemented to the casing.

The casing is provided with a multiplicity of built-in bearing surfaces, each destined for a lens. For each lens a special upper clamping pipe is provided, whose bearing surface is adapted to said lens.

Each lens is centered in the same way as described hereinbefore.

By means of this method a lens system or objective is obtained with an overall accuracy better than 1 minute of arc between the mechanical and optical axes off the system.

The methods according to the invention outlined above can be performed with the aid of a centering device in which each clamping pipe is connected to a pressure chamber containing the medium.

In an embodiment of the centering device at least one clamping pipe is disposed on a plunger, which plunger is provided with a channel which connects the interior space of the clamping pipe to the pressure chamber.

The pressure chamber is connected to a compressed-air line or forms part of a hydraulic system.

The invention now will be described in more detail with reference to the drawing, in which FIG. 1 is a schematic view of a lens showing optical eccentricity;

FIG. 3 is a sectional view of a centering device embodying the method according to the invention;

FIG. 4 is a sectional view of a mount with lens according to the invention;

Centering of a lens is to be understood to mean the operation of making the mechanical axis of the mounted lens coincide with the optical axis.

Figure 1:
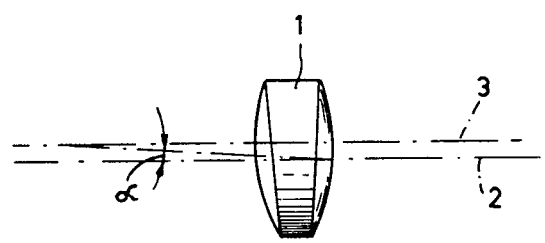

FIG. 1 schematically shows how these axes are disposed in the case of an unmounted bi-convex lens 1. Said lens 1 has a mechanical axis 2 and an optical axis 3, which make an angle $\alpha$ with each other.

Figure 2:
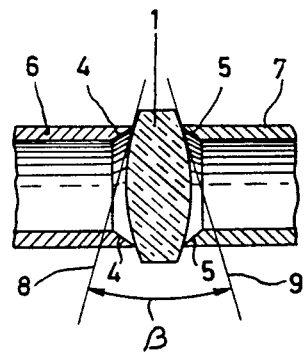
FIG. 2 is a sectional view of a known centering device.

The method of centering lenses according to the previously cited book "Feinoptik-Glasbearbeitung" is shown in of FIG. 2 in which lens 1 is clamped between two bearing surfaces 4 and 5 of the clamping pipes 6 and 7 respectively.

The angle of friction discussed in the introduction is the angle β between the tangents 8 and 9 to the curved faces of lens 1.

As shown in FIG. 3 the lens 11 to be centered is placed in a lower clamping pipe 10 which functions as a mount. The lens rests on a conical bearing surface 12 of clamping pipe 10, which conical shape is matched to the spherical shape of the lens 11 which it engages, in such a way that the lens rests on the outer edge 13 of the bearing surface.

The clamping pipe or mount 10 rests on a seal ring 15 in a lower plunger 14 has. The lower plunger comprises a central channel 16 which connects the interior space 17 of clamping pipe 10 with a pressure chamber, not shown.

The mount (clamping pipe ) 10 is provided with a cylindrical casing 18, in which a clamping pipe 19 which functions as upper plunger can move with a close fit. The clamping pipe 19 has a bearing surface 20 which is conical or slightly spherical and whose shape is substantially matched to the co-operating lens surface. Clamping pipe 19 is also provided with a central channel 21 which communicates with the pipe interior space 121 and can be connected to a pressure chamber, not shown.

The cylindrical casing 18 has a number of vent holes 22 at the location of the lens 11. The upper clamping pipe 19 furthermore has axial air bearings around its periphery supplied from channels 23 connected to a pressure chamber, not shown, to ensure accurate vertical travel of clamping pipe.

During the centering process the upper clamping pipe 19 is lowered. Simultaneously, channels 16 and 21 are connected to the pressure chamber, so that compressed air enters the voids between the bearing surfaces 13 and 20.

The upper clamping pipe 19 is lowered so far that a very narrow gap is obtained between bearing surface 13 and lens 11. The air passes through the gap and is discharged through the vent holes 22.

As the pipe 19 approaches the lens, the lens comes clear of its bearing surface 13 and starts floating. The bearing gap is then approximately 0.05 mm. As a result of the high pressure in the air bearing thus formed the lens is aligned by equalization of the gap around the periphery of each bearing. Immediately after this the upper clamping pipe 19 is lowered slightly further with a greater force than the recovery force of the centering bearing formed, so that the lens is fixed between the bearing surfaces 13 and 20. The lens then remains in the centered position.

The lens is now secured in the cylindrical casing 18 of clamping pipe or mount 10, for example by injecting cement which is which is through the vent holes 22 by means of a gun 24 (shown schematically).

Figure 5:
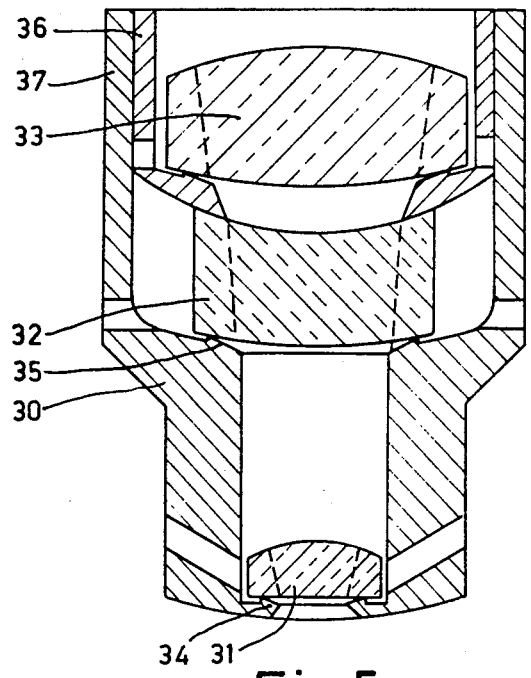
FIG. 5 is a sectional view of an objective lens according to the invention.

After the securing operation, the upper clamping pipe 19 is removed from the cylindrical part 18 of the lower clamping pipe 10 and the product is finished. This product, shown in FIG. 4, consists of a mount in which a lens is cemented. The cylindrical mount may be used as an insert for a composite lens system such as an objective, as is shown in FIG. 5.

The objective consists of a cylindrical casing 30 which accommodates an assembly of three lenses 31, 32 and 33. The casing is provided with two bearing surfaces 34 and 35 which serve as mounting rims for the lenses 31 and 32 respectively.

To manufacture such an objective, the casing 30 is first placed on the lower plunger 14 of the centering device oF FIG. 3. Then the lenses 31 and 32 are consecutively fitted, centered and cemented in place in accordance with the above method, a different upper plunger 19 with a diameter to match the casing 30 being used for each centering operation.

Subsequently, a separately manufactured insert 36 with the lens 33 as shown in FIG. 4 is placed in the upper cylindrical part 37 of the casing 30 with a close fit.

Objectives thus manufactured can be made in mass production with very high accuracy — less then 1 minute of arc between mechanical and optical axis of the system.

Figure 6:
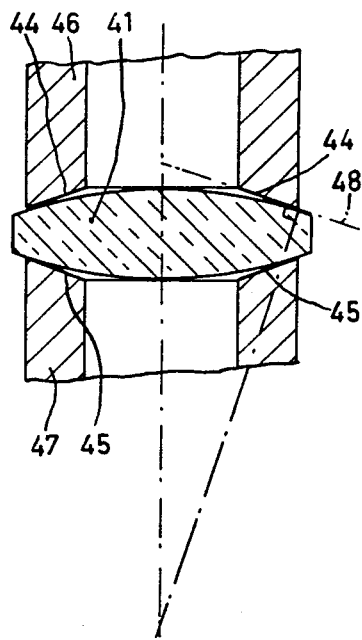
FIGS. 6 and 7 are sectional views of air-bearings according to the invention.
Figure 7:
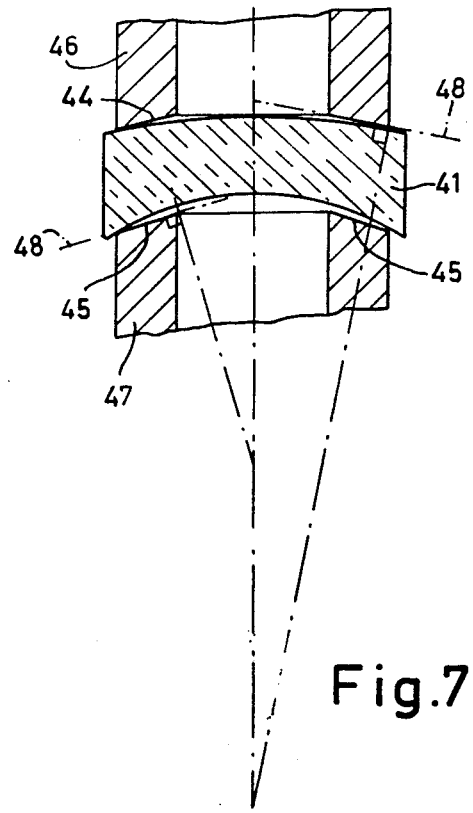

To explain the above centering method in greater detail, FIGS. 6 and 7 show a bi-convex and a concave-convex lens respectively the centered in the air-gap bearings.

The lens 41 is disposed between the bearing surfaces 44 and 45 of the clamping pipes 46 and 47 respectively.

Between each lens surface and associated bearing surface air-gap bearings are sustained during centering, which narrow down from the inside towards the outside, in the direction of flow of the medium. The bearing surfaces are conical, the generatrices 48 of said cone being parallel to the tangents of the spherical lens surface at the outer and inner edges of the bearing surfaces for the case of convex and concave lens surfaces respectively. The distance between them is so small — approximately 50 μm — that the lines coincide in the figures.

What is claimed is:

1. A method of optically centering at least one lens in a lens mount, comprising:
   a. placing a lens mount having a bearing face against which the lens is to be located and an interior space on a centering device having means for admitting a medium under pressure to said interior space,
   b. placing the lens between said bearing face and a facing bearing face of a clamping pipe having an interior space,
   c. admitting a medium to the interior spaces of the clamping pipe and the lens mount respectively,
   d. moving at least one of said pipe and said lens mount toward each other until a bearing gap is formed between each lens surface and the corresponding bearing face,
   e. then further moving at least one of said pipe and said lens mount toward each other with a greater force than the recovery force of the bearing gap formed in step (d) so that the lens is fixed between the bearing surfaces of the pipe and the mount, and then
   f. securing the lens in the mount.

2. A method as claimed in claim 1, wherein the medium is a liquid.

3. A method as claimed in claim 1, wherein the medium is compressed air.

4. A device for aligning a lens in a mount having an interior space open at an end of the space and a bearing surface at said space end against which the lens is to be located, said device comprising a clamping pipe having a bearing surface on an end and an interior space open at said end; means for locating said lens mount coaxially with said clamping pipe, such that said lens mount bearing surface faces the bearing surface of the clamping pipe; and means for admitting a medium under pressure to the respective interior spaces of said pipe and said mount.

5. A device as claimed in claim 4, comprising in addition a plunger having a channel therethrough for connection to a pressure chamber, said clamping pipe being disposed on said plunger such that said channel communicates with the interior space of the pipe.

6. A lens system comprising at least one lens optically centered on a mount, said mount comprising a cylindrical casing for the lens, said mount having a bearing surface in contact with the lens around the outer edge of the bearing surface, the generatrices of said bearing surface corresponding to a tangent to the lens at any point along said outer edge.

7. A lens system as claimed in claim 6, wherein said bearing surface is conical.

8. A lens system as claimed in claim 6, wherein said bearing surface is spherical.

9. A lens system as claimed in claim 6, wherein said casing has a number of openings at the location of each lens.

* * * * *

UNITED STATES PATENT OFFICE
CERTIFICATE OF CORRECTION

Patent No. 4,046,458                     Dated September 6, 1977

Inventor(s) Hendricus F. G. Smulders et al.

It is certified that error appears in the above-identified patent and that said Letters Patent are hereby corrected as shown below:

Col. 1,  line 22,  before "as" insert --increases-- line 62,  after "greatest" insert --if-- line 64,  delete "at the"

Col. 2,  lines 8 and 9, delete ". Subsequently"

line 10,  after "interior space" insert

-- . Subsequently-- line 33,  "off" should be --of-- line 68,  delete "of"

UNITED STATES PATENT OFFICE
CERTIFICATE OF CORRECTION

Patent No. 4,046,458      Dated September 6, 1977

Inventor(s) Hendricus F. G. Smulders et al.

It is certified that error appears in the above-identified patent and that said Letters Patent are hereby corrected as shown below:

Col. 3, line 14, delete "comprises" and insert --has-- line 49, "Immediately" should start a new paragraph.

line 57, "which is which is" should be deleted

Col. 4, line 20, "the" should be deleted

Signed and Sealed this

*Twentieth* Day of *December 1977*

[SEAL]

Attest:

RUTH C. MASON
*Attesting Officer*

LUTRELLE F. PARKER
*Acting Commissioner of Patents and Trademarks*